United States Patent [19]

Maix

[11] Patent Number: 4,898,757
[45] Date of Patent: Feb. 6, 1990

[54] CONVERTIBLE TEXTILE FIRE BLOCK MATERIAL

[76] Inventor: Anton Maix, P.O. Box 21306, Ft. Lauderdale, Fla. 33335

[21] Appl. No.: 757,478

[22] Filed: Jul. 22, 1985

[51] Int. Cl.$^4$ ............................................. B32B 3/02
[52] U.S. Cl. ................................ 428/97; 428/85; 428/95; 428/225; 428/233; 428/255; 428/408; 428/920
[58] Field of Search ............ 428/920, 408, 85, 95, 428/97, 225, 233, 255; 156/82; 264/345, 346

[56] References Cited

U.S. PATENT DOCUMENTS 4,463,465  8/1984  Parker et al. ..................... 428/280
4,513,042  4/1985  Lumb ................................ 428/920

Primary Examiner—James J. Bell
Attorney, Agent, or Firm—Malin, Haley & McHale

[57] ABSTRACT

A new and improved fire block textile material comprising a carrier means and a textile material means that provides a cover in a first state and a fire block barrier in a second state. The textile material includes a wool yarn material formed as the face layer of the textile material which is convertible by heat from a fire into a fire barrier layer. Wool yarn material is connected to and carried by an under construction material or carrier means. Said carrier means supports the wool yarn material in its first normal state as a textile and supports the charred portion of the wool yarn material in its second charred state as a fire block layer. The wool yarn material has a structure which permits it to bead on exposure to the flux of heat from a fire. The bead recedes or travels along the yarn away from the source of the heat while the fire barrier layer acts as a fire block. A plurality of such beads connect together to form a surface which acts both as a barrier to flame and a barrier to heat transfer to the carrier means and to the material below the carrier means.

24 Claims, 1 Drawing Sheet

CONVERTIBLE TEXTILE FIRE BLOCK MATERIAL

BACKGROUND OF THE INVENTION

1. Field of Invention:

A textile product providing a normal textile material having one face layer that is convertible by flux of heat into a solid charred fire block layer even at temperatures up to approximately two thousand degrees farenheit.

2. Description of Related Art:

All too commonly a fire may begin when a cigarette falls onto upholstery or into clothes as a person falls asleep holding a burning cigarette. A cigarette, of course, is designed to sustain steady smoldering combustion. The cigarette continues its smoldering combustion where it falls. Sometimes the cigarette continues to smolder for hours, filling the house with toxic vapors. At other times the smoldering cigarette changes into flaming combustion. With an open flame to heat up adjacent objects to their ignition temperatures, the second phase—the phase of exponential growth—begins. Exponential growth begins more quickly during such occurrences as airplane crashes. Burning of seat cushions beneath textile covers adds to quick exponential growth the presence of overwhelming amounts of toxic gases.

When it comes to doing something to prevent or halt catastrophes that occur from exponential growth of fires, measures have been taken in part by recognizing that portions of our surroundings are combustible and add fuel to a fire. The fact that the environment of a house or airplane is combustible does not persuade people to dispense with the amenity of the clothes they wear, the bedding in which they spend a fourth of their lives, the drapes at the window, the chair and desk in the den, the upholstered furniture in the living room or in the plane cabin in exchange for wearing asbestos clothing or sitting on ceramic or metal chairs. The gypsum materials in the wall and the ceiling will not burn, but the wallpaper will and molding will. The frame of the house is wood, the roof is wood, perhaps with asphalt shingling, and the exterior is probably wood, at least in part. An airplane includes plastic ceiling, seat cushions and walls. The structures could, of course, be made safe from fire, in much the same way as the stone, brick, and concrete of many of the multiple-occupancy dwellings in the cities or metal materials used in many military aircraft. Even today the contents of the structure a airplane remain as combustible as before.

1. The material properties of the instant invention depend upon density, total heat content, heat capacity, thermal conductivity, chemical analysis and heat of gasification.

2. Behavior of samples in fire tests depend upon ease of ignition, rate of heat release, rate of surface flame spread, rate of smoke release, rate of toxic gas release and radiant power from flame.

3. Critical survival variables in a burning dwelling or aircraft include temperature vs. time, smoke particulates vs. time and toxic gas vs. time. The time it takes for fire to spread and engulf a structure and for toxic gases to spread therethrough is proportional to the impact on life and health of persons inside.

Inherently fire-resistant polymers have been fashioned for use in the clothing of people whose occupations expose them to the hazards of fires. The more familiar polymers, natural and synthetic, in common use for clothing, house and airplane furnishings such as appliance housings and furniture made of molded polymers may be upgraded for fire resistance. The strategy is to add to the polymer—in its synthesis or by impregnation or by coating—certain elements that share the curious property of interfering at one stage or another in the chemistry and physics of combustion. Principal among these are phosphorus, antimony, boron, chlorine, and bromine. The phosphorous compounds act by alterning the decomposition of the fuel. For cellulose the mechanism is well known. The phosphorous compound decomposes in the heat of the fire to form phosphoric acid, which then reacts with cellulose to produce large amounts of carbon char, at the expense of the reactions that normally would generate combustible gases. Such treatment makes a material hard to ignite with a small ignition source. The reactive halogens, chlorine and bromine, function in the chemistry of the flame itself as "radical poisons," terminating radical chain reactions that occur in the flame. The compound containing the halogen first vaporizes and then decomposes to intercept radicals essential to the propagation of the flame reactions. An example is the removal of a hydrogen free radical by a bromine compound:

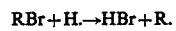

$$RBr + H. \rightarrow HBr + R.$$

In this reaction the sluggish organic fragment, R., replaces the hydrogen radical.

The cellulose textiles, cotton or rayon (from wood pulp), are most often treated with phosphates or borax-boric-acid mixtures. To secure resistance to water in laundering, the phosphorous may be locked into the cellulose by reacting the cellulose with a phosphorous-containing compound or, in the synthesis of rayon, by polymerizing the monomer with a phosporous-containing monomer. This technology is employed in making textiles for children's sleepwear, which is almost the only protective measure established by the upsurge of national concern about fire at the beginning of the last decade.

For the protection of people textiles are now available made of inherently fire-resistant synthetic-polymer fibers. The materials are expensive, and they do not make up into attractive fibers for everyday wear. They serve well, however, in coveralls, flight suits, and uniforms, and they have a record of saving their wearers from calamity.

One family of fibers, marketed as the aramids by the DuPont Company, consists of aromatic (benzene-ring-containing) versions of nylon, such as DuPont's NOMEX.

Nylon melts easily (and can cause severe burns by so doing, without burning) and burns with the help of sufficient heat from a fire. The aramid fiber does not melt or burn, but chars and stiffens.

Whereas the aramid fiber has a hydrogen on its nitrogen, offering oxygen a site of oxidative attack, another structure—the aromatic imide polymer—does not. Exposed to direct flaming, it shrinks and blackens but is not consumed and does not produce much smoke.

SUMMARY OF THE INVENTION

This invention relates to a new and improved fire block textile material. The fire barrier textile material includes a carrier means and a textile material means that provides a cover in a first state and a fire block or barrier in a second state.

At least a portion of the textile material, a wool untreated with fire retardant materials, is convertible by fire, flux of heat, into an effective fire barrier or fire block material. The textile material includes a wool yarn material formed as the face layer of the textile material and convertible by the heat from a fire into a fire barrier layer. The wool yarn material is connected to and carried by an under construction material or carrier means. The under construction carrier supports the wool yarn material in its first normal state as a textile and supports the charred portion of the wool yarn material in its second charred state as a fire block carrier. The wool yarn material has a structure capable of beading under the flux of heat from a fire. The bead of charred material recedes or travels along the yarn away from the source of the flux of heat while the fire barrier layer acts as a fire block. The bead is relatively strong and is firmly connected to the wool yarn as it recedes and after the flame is removed.

The wool yarn material is untreated with fire retardant chemicals. The wool yarn material produces the lowest amount of toxic gases when subjected to flux of heat, even up to 2000 degrees farenheit.

The carrier, when using special rayon such as VISCOSE by American Rayon and woven very densely, includes a plurality of through openings. There is a special rayon material that is a slow burning material which allows only low toxicity. The special rayon material continues to hold the form of its weave allowing the screen construction to support the charred residue of the wool face. The charred wool face not only remains intact, but providing the secondary phase of appearance of the textile material product that is firm, resistant to touch or gravity, that is completely flame retardant, or even flameproof and resistant to penetration of heat resulting in means to limit conduction of heat from a source beyond the newly created fire wall. The perimeter of each opening is surrounded by the carrier means. The carrier is the warp and weft formed by known textile processes. The carrier may be a rayon such as the material known as SUPEREX.

The wool yarn material with a fire resistant under construction carrier layer remains intact when subject to a flux of heat 2200 degrees farenheit or above for a few minutes or more without burning the carrier or the rear portion of the wool yarn material.

During the burning, and hence beading, process, beads of wool yarn material join or merge together to form a fire blocking surface. The first blocking surface acts both as a barrier to flame and as a barrier to heat transfer to the carrier means and to the material below the carrier means.

The problem solved by this invention is the manufacturing of a fabric which in its final manufactured state is flame resistant but not flameproof but in its secondary state after ignition of the flame side portion of the wool material becomes flameproof. This is accomplished by this invention without the use of chemicals. The fire block or barrier created continues to remain in its secondary state preventing the flux of heat and flames from spreading. The fabric in its second state acts as a fire block to anything that it covers thereby preventing covered material (i.e.: see cushion material) from burning and giving off toxic gases, and preserving life by controlling the spread of flames and confining the fire to a limited area where it may be controlled and/or extinguished.

The technique of weaving this unique textile makes it applicable for clothing, wallcovering, textiles of all types, upholstery, draperies, curtain material, carpeting and it may be produced in all densities, weights and widths.

The solution entails the utilizations of two types of yarns in the convertible textile material product. The first yarn or textile material means is inherently flame resistant but burns slowly and chars. The second yarn (or carrier layer) is flame resistant and may be artificially produced, as slower ignition and burn, and acts as a carrier screen to support the charred remains of the first yarn. The second yarn when woven provides a screen having properties upon which the charred residue (fire block layer) of the first yarn may attach itself. The first yarn is woven principally on the face of the fabric. The largest proportion of the first yarn is in the pile of the fabric. The second yarn is in the warp and the weft providing a support screen and under construction to hold the first yarn tightly and making the pile very dense. It may also be a binding warp. The second yarn is the construction which holds the wool in its material state and provides a carrier means for the charred wool fire block layer to adhere to in its second state after exposure to a flame as a retardent barrier layer or face.

The principle of this construction is to provide a surface of a textile that will be resistant to flame, because of the nature of the yarn, such as wool, which will burn and in burning will bead and char. The merged beads will be left hanging on the remaining wool pile an on the back side of the fabric and on the screen of the closely knit warp and weft of the second yarn. The textile in its final state has a charred surface, completely covering a carrier screen which has not been consumed by the flux of heat or flame and lends a backing to the charring. The textile in the second state is flameproofed because the wool's original state was changed by fire and thereafter continues to perform as a block to fire and the flux of heat.

It is an object of this invention to provide a noncomplex material structure that is useable as a textile that is capable of partially changing state to provide a layer that acts as a fire block.

Another object of the invention is to provide as convertible textile flame barrier material that is not treated with fire retardant chemicals and hence does not produce toxic gases upon exposure to high heat.

In accordance with these and other objects which will be apparent hereinafter, the instant invention will now be described with particular reference to the accompanying drawings.

DESCRIPTION OF THE PREFERRED EMBODIMENT

Figure 1:
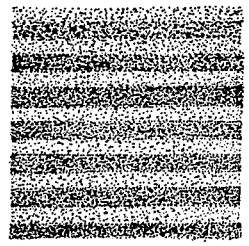
FIG. 1 is a top view illustration of a single fabric textile material or product in the first or unburned state showing the front face.
Figure 2:
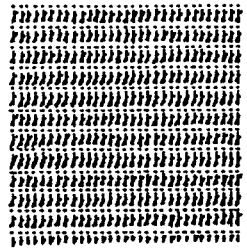
FIG. 2 is a rear view illustration of the textile material product in the first state showing a rear face.
Figure 3:
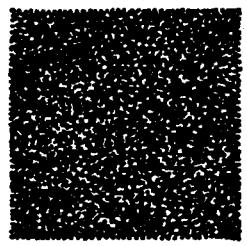
FIG. 3 is a top view illustration of the textile material product in the second state.
Figure 4:
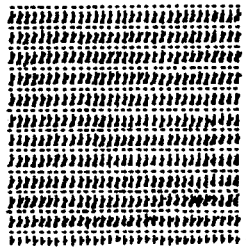
FIG. 4 is a rear view illustration of the textile material product with the front in the second state.
Figure 5:
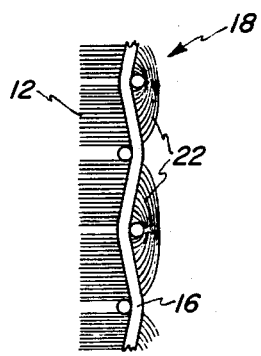
FIG. 5 is a side view illustration with the left side in the first state.
Figure 6:
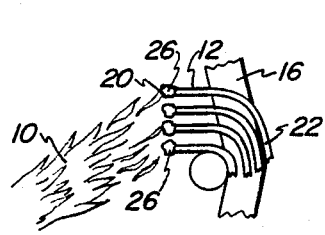
FIG. 6 is a side view illustration with the left side in between the first and second state.

Referring now to a single fabric with a front face and a rear face and the parts thereof in the drawing FIGS. 5 through 10, the flux of heat from an external source of radiation such as a flame 10 raises the temperature of the pile layer 12 of the wool yarn to the ignition point with a rear or interior weave 22. The wool yarn is connected to said pile layer 12 being woven together with the warp and weft of the under construction carrier means 14 constructed of a flame resistant second yarn 16. The pile chars and the second material does not burn and char in the convertible textile material product 18. The wool in the convertible textile material converts or changes state as more fully set forth below After ignition of the wool yarn in layer 12 is begun, of the flame 10 as illustrated in FIG. 6, there may be an additional flow of heat to the surface of the convertible textile material by radiation from the flame 20 of the wool yarn.

A chemical reaction dependant on temperature, reaction rate, and combustion reactions occurring in the wool yarn pile layer 12. The individual wool threads bead chars due to the low heat conductivity. The incident energy piles up on the surface while the individual interior surface 22 or surface opposite the flux of heat remains relatively cool. Even with the front surface aflame, the block of insulation 24 grows from the beads 26 in FIG. 6 to allow the inside to remain relatively cool. The beads are charred remnants of the wool pile 12. The charred remnants of the wool pile 12 becomes insulation. The wool yarn is resistant to burning but does burn when in contact with flame up to and above two thousand degrees farenheit. The wool does not melt. Rather, the wool yarn readjusts itself by blackening, charring, and receding toward the warp and weft of the second yarn as shown in FIG. 6 and more or less assumes a carbon bead like shape over and partially between the warp and weft of the second under construction yarn with the bead-like blackened, charred, chemically changed remnants of wool yarn spreading laterally over the warp and weft forming a charred layer 28 of thermally changed wool yarn. The charred wool yarn grows together to become a block of insulation 24, shown in FIG. 8. The wool yarn does not pass through a liquid, but rather passes through a process known as pyrolysis, decomposition by fire or flux of heat.

Figure 7:
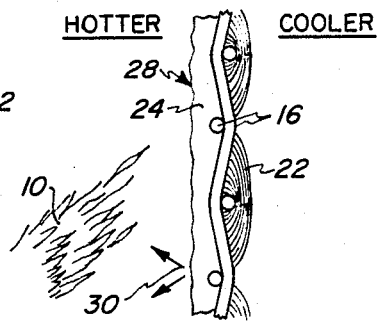
FIG. 7 is a side view illustration with the left side in the second or fire barrier state.
Figure 8:
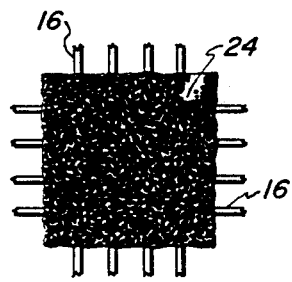
FIG. 8 is a front view illustrating the fire barrier.
Figure 9:
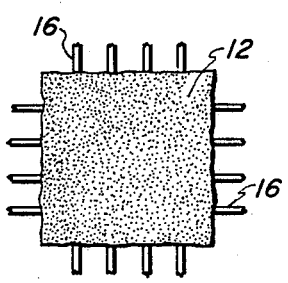
FIG. 9 is a front view illustrating the wool pile.
Figure 10:
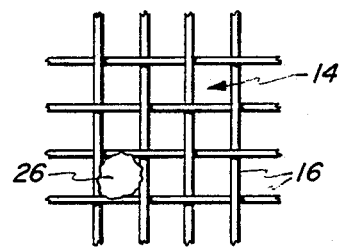
FIG. 10 is a front view illustrating the carrier means.

The charred fire barrier wool yarn layer 28 has insulating effects and reflects the flux of heat back toward the source of the intruding flux of heat, see numeral 30. Layer 28 also insulates the warp and weft of carrier means 14 of the second under construction yarn from heat energy flow by radiation as shown in FIG. 7. At the same time, layer 28 insulates the area below the carrier means to prevent burning or melting of, for example, foam seat cushion materials, which give off toxic gases when sufficiently heated.

The test conducted on many prototypes of the textile product failed. This invention tested successful when the fire resistant carrier material 14 of rayon was placed on the back of the wool material 12 to allow the charred high pile wool material 24 to cling to the high pick warp and weft of the rayon carrier material 14.

The illustrated textile material is a product that includes wool yarn as pile and a rayon fire retardant material as the warp and weft screen backing. It should be noted that this technique is applicable to other weaves such as flat woven, jacquard, tapestry, etc. The backing is of a high pickage. The pickage may be as high as 100 picks or more. The wool pile has a high thread per inch count. The wool pile may be as high as 50 or more. The textile product has a relatively small heat content, low heat capacity, low thermal conductivity. The textile product is resistant to ignition, has a small rate of heat release, has a very low rate of surfce flame spread, low rate of smoke release, has a very low rate of toxic gas and smoke release, and a low radiant power from flame. When flux of heat is directed toward the front side of the textile material there is little rise of temperature over a relatively significant amount of time at the rear side of the textile material. The textile material has great impact on life in regard to safety in protecting life and property and in regard to preventing release of toxic gases that endanger life.

In the present invention the surface of the textile material facing the heat of flux retards burning but over time will burn at an initial high rate and thereafter be reduced in time as the flame and material is reduced and charred material is increased and the reflectivity and insulating quality of the front surface is increased.

The wool textile material used as a pile in this system may be any live wool or virgin wool. The carrier means may be any rayon that burns slowly and preferably a rayon that burns slower than the wool textile. The carrier means may be a flame retardant yarn and preferably a flame retardant yarn that burns more slowly than the wool textile. For example, DuPont's NOMEX may be used as the carrier. A carbonized yarn may also be used as the carrier means, for example carbonized glass.

This convertible textile material product may be used as an upholstery or airplane seats.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A single textile material fabric having at least a portion thereof convertible by flux of heat into a fire barrier material, comprising:

a woven wool textile material means for forming a portion of said single fabric, said material means including a front face in a normal, first state, said material means also having a rear face, at least a portion of said front face being convertible by heat or flame into a fire retardant barrier with a fire retardant barrier face in a fired, second state to protect said rear face; and a carrier means connected to said material means forming an under construction for said single fabric, said carrier means for supporting said material means in said normal, first state for use as a textile fabric and for supporting said fire retardant barrier and said textile material means in said fired, second state for use as a fire retardant barrier, said carrier means connected to said material means in said normal, first state and said fired, second state, whereby said single fabric is usable alone as a fire retardant barrier for matter situated rearward of said rear face.

2. The textile material fabric as set forth in claim 1, wherein:
said textile material means constitutes the sole means convertible by heat or flame into said fire retardant barrier.

3. The textile material fabric as set forth in claim 1, wherein:
said textile material means has a structure and composition capable of beading under heat or flame on the same side of said single fabric as the heat source to form beads of charred textile material means that remain connected to the remaining uncharred said textile material means;
each said bead of charred material means connected to said carrier means and supported in an array of beads of said charred said textile material means as a fire retardant barrier face on said same side.

4. The textile material fabric as set forth in claim 3, wherein:
said textile material means is a tightly woven wool means; and
said carrier means is a fire retardant textile material.

5. The textile material fabric as set forth in claim 3, wherein:
said carrier means defines a plurality of through openings, said charred material covering said through openings.

6. The textile material fabric as set forth in claim 5, wherein:
said charred material covers said carrier means.

7. The textile material fabric as set forth in claim 6, wherein:
said beads are connected together thereby forming a surface layer.

8. The textile material fabric as set forth in claim 7, wherein:
said single textile material fabric is capable of withstanding heat or flames of approximately two thousand degrees farenheit for a few minutes without burning said carrier means and said rear face.

9. The textile material fabric as set forth in claim 8, wherein:
said single textile material fabric is capable of withstanding heat or flames of four thousand degrees farenheit for a few minutes without burning said carrier means or said rear face.

10. The textile material fabric as set forth in claim 7, wherein:
said textile material means is wool having a forward portion convertible into said fire retardant barrier face on one side of said carrier means and a rear portion positioned on the other side of said carrier means which said heat or flame of two thousand degrees farenheit for a few minutes does not burn said rear portion of said wool means protected by said fire retardant barrier face.

11. The textile material fabric is set forth in claim 5, wherein:
said textile material means is a wool yarn and is structured with a tightly woven weave.

12. The textile material fabric as set forth in claim 10, wherein:
said textile material means includes a pile material having a relatively high dense pile.

13. The textile material fabric as set forth in claim 11, wherein:
said carrier means is a textile material.

14. The textile material fabric as set forth in claim 2, wherein:
said fire retardant barrier face is completely carbonized.

15. The textile material fabric as set forth in claim 14, wherein:
said fire retardant barrier face is a flame proof face.

16. The textile material fabric as set forth in claim 1, wherein:
said single textile material fabric is comprised only of tightly woven wool and said carrier material is a fire resistant textile material, whereby no chemical retardants need to be used.

17. The textile material fabric as set forth in claim 1, wherein:
said single convertible textile material fabric is capable of withstanding heat or flames of two thousand degrees farenheit for a few minutes without burning said carrier means or said rear face.

18. The textile material fabric as set forth in claim 1, wherein:
said single convertible textile material fabric is capable of withstanding heat or flames of four thousand degrees farenheit for a few minutes without burning said carrier means or said rear face.

19. The textile material fabric as set forth in claim 1 wherein said carrier means is a rayon material.

20. The textile material fabric as set forth in claim 1 wherein said carrier means is a carbon yarn.

21. A single textile material fabric, comprising:
a tightly woven wool yarn textile material means for forming a portion of said single material fabric including a front face and a rear face, and
a carrier means connected to said wool textile material means forming an under-construction of said single textile material fabric, said carrier means for supporting said textile material means in a normal, first state for use as a textile fabric, said carrier means connected in and to said wool textile material means in said normal, first state;
said carrier means including a plurality of through openings with a perimeter of each said opening formed by said carrier means;
one face of said wool textile material means upon exposure to heat or flames convertible to a fire retardant barrier surface by beading of said wool textile material means, said fabric thereby capable of withstanding said heat or flames of approximately two thousand degrees farenheit for a few minutes without burning said carrier means or the other face.

22. A single textile material fabric as set forth in claim 28, wherein:
one face of said wool textile material means capable of withstanding heat or flames of four thousand degrees farenheit for a few minutes without burning said carrier means or the other face.

23. A single textile material fabric as set forth in claim 22, wherein:
said carrier means is a carbonized yarn.

24. The textile material fabric as set forth in claim 23, wherein:
said carrier means includes a rayon material;
said wool textile material means being free of fire retardant chemicals.

* * * * *